(12) United States Patent
Buffa

(10) Patent No.: US 9,841,612 B2
(45) Date of Patent: Dec. 12, 2017

(54) COMPONENT OF A FRAME FOR EYEGLASSES

(71) Applicant: LUXOTTICA S.R.L., Agordo (IT)

(72) Inventor: Federico Gianluigi Buffa, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 0 days.

(21) Appl. No.: 14/914,753

(22) PCT Filed: Aug. 25, 2014

(86) PCT No.: PCT/EP2014/067973
§ 371 (c)(1),
(2) Date: Feb. 26, 2016

(87) PCT Pub. No.: WO2015/028416
PCT Pub. Date: Mar. 5, 2015

(65) Prior Publication Data
US 2016/0209673 A1    Jul. 21, 2016

(30) Foreign Application Priority Data

Aug. 30, 2013  (IT) .............................. MI2013A1428

(51) Int. Cl.
G02C 5/14     (2006.01)
G02C 5/00     (2006.01)
G02C 5/06     (2006.01)
G02C 5/16     (2006.01)

(52) U.S. Cl.
CPC .............. *G02C 5/008* (2013.01); *G02C 5/06* (2013.01); *G02C 5/16* (2013.01)

(58) Field of Classification Search
CPC .... G02C 5/008; G02C 2200/12; G02C 5/143; G02C 5/16; G02C 5/14; G02C 2200/14

USPC .................................. 351/111, 121, 41, 114
See application file for complete search history.

(56) References Cited

U.S. PATENT DOCUMENTS

| 3,597,053 | A | * | 8/1971 | Mastman | ............... G02C 5/126 |
| | | | | | 264/222 |
| 3,944,344 | A | | 3/1976 | Wichers | |
| 5,450,142 | A | * | 9/1995 | Brhel | .................... G02C 5/146 |
| | | | | | 351/111 |

(Continued)

FOREIGN PATENT DOCUMENTS

DE        875876 C         5/1953
WO        2009080444 A1    7/2009

OTHER PUBLICATIONS

International Search Report dated Oct. 29, 2014 re: Application No. PCT/EP2014/067973; pp. 1-4; citing: U.S. Pat. No. 3,944,344 A, U.S. Pat. No. 6,758,562 B1, DE 875 876 C, U.S. Pat. No. 6,250,756 B1, U.S. Pat. No. 2011/080556 A1 and WO 2009/080444 A1.

(Continued)

*Primary Examiner* — Hung Dang
(74) *Attorney, Agent, or Firm* — Cantor Colburn LLP

(57) ABSTRACT

A component of a frame for eyeglasses includes a body made of composite material, the peculiarity of which relates to the body having at least one first region and at least two second regions. The first region includes a three-dimensional shape with at least two dimensions that are larger than the dimensions of the at least two second regions. Thus, the configuration defines, along the body, portions with different flexibilities.

9 Claims, 2 Drawing Sheets

(56) References Cited

U.S. PATENT DOCUMENTS

| | | | | |
|---|---|---|---|---|
| 5,452,028 | A | * | 9/1995 | Iijima .................... G02C 5/00 351/111 |
| 5,638,145 | A | * | 6/1997 | Jannard ................ G02C 11/08 2/435 |
| 6,139,143 | A | * | 10/2000 | Brune .................. G02C 3/003 16/228 |
| 6,250,756 | B1 | | 6/2001 | Jannard et al. |
| 6,758,562 | B1 | | 7/2004 | Barnette et al. |
| 7,185,982 | B2 | * | 3/2007 | Dietz .................... G02C 5/143 351/111 |
| 2011/0080556 | A1 | | 4/2011 | Yee et al. |
| 2012/0050664 | A1 | * | 3/2012 | Chen ................... G02C 5/2209 351/121 |

OTHER PUBLICATIONS

Written Opinion dated Oct. 29, 2014 re: Application No. PCT/EP2014/067973; pp. 1-6; citing: U.S. Pat. No. 3,944,344 A, U.S. Pat. No. 6,758,562 B1 and DE 875 876 C.

* cited by examiner

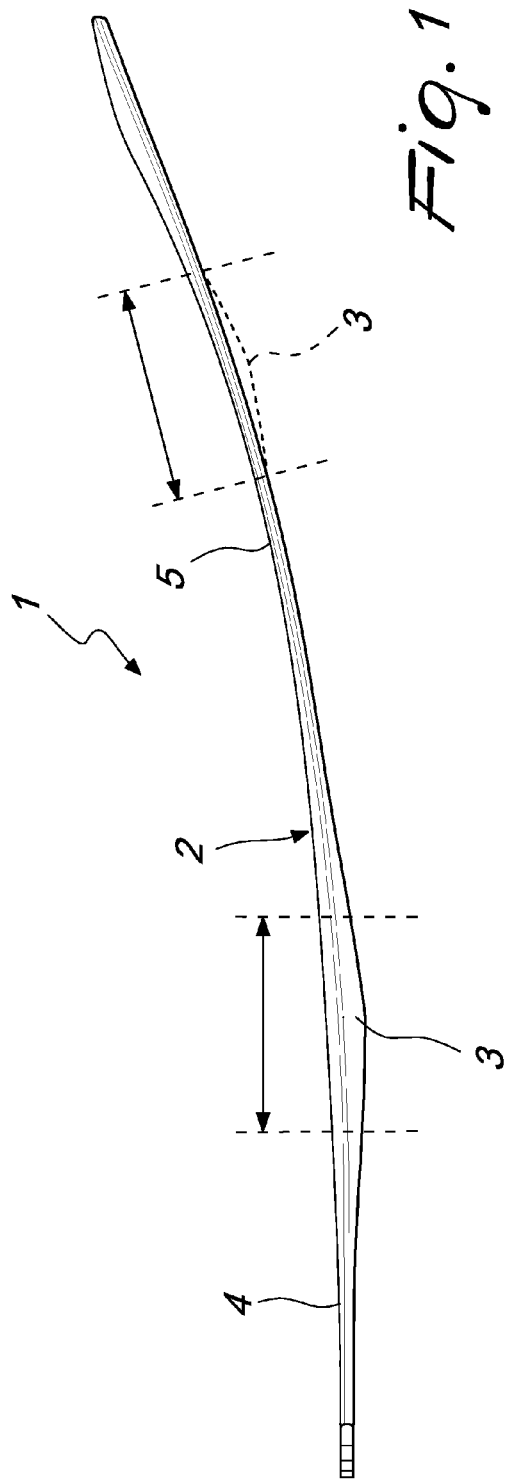
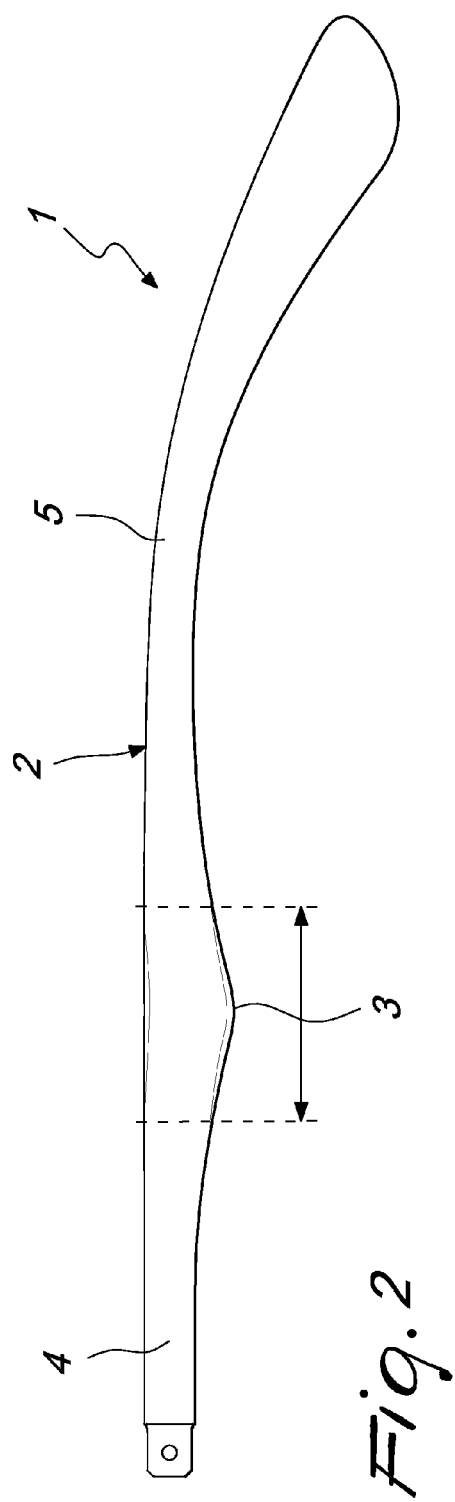

COMPONENT OF A FRAME FOR EYEGLASSES

TECHNICAL FIELD

The present disclosure relates to a component of a frame for eyeglasses. More specifically, the disclosure relates to a component of a frame for eyeglasses which combines the characteristics of flexibility and comfort of use for the user.

BACKGROUND

Conventional eyeglasses are widespread on the market with component parts, such as for example temples, that are made of composite materials that comprise reinforcement fibers, including carbon fibers, that are adapted to strengthen the frame or the temples of the eyeglasses.

The problem with providing components of eyeglasses made from composite materials is that of improving the bending capacity of the component, in particular of the temples, or the mechanical performance, but these two requirements are often in contrast with each other, and thus, having an adequate bending capacity of the component means not having an equally adequate mechanical performance, with consequently easy breakage.

In particular, patent application WO2009/080444 discloses a temple for eyeglasses which comprises a first portion made of composite material based on a fiber-reinforced polymer and at least one film of thermoplastic polymeric material coupled to the aforementioned first portion so as to cover the same.

Such embodiment makes it possible to obtain an adequate flexibility of the component (temple) and a sufficient resistance to breakage.

However, the temple that is the subject matter of the above-mentioned patent application has a cross-section that is practically constant over its entire extension, and thus the aesthetic appearance of the temple is unattractive, since the volumes are not highlighted and the curves do not stand out.

Furthermore, a temple of this type, which has a linear ratio of strength to deformation, does not have a flexibility response such that it can be adapted to the different types of heads of the users, which can have many shapes.

SUMMARY

The aim of the present disclosure is to provide a component of a frame for eyeglasses that can be made of composite materials, and that is capable of providing pleasing aesthetic characteristics together with high robustness in use.

Within this aim, the present disclosure provides a component of a frame for eyeglasses that is capable of offering a "three-dimensional effect", without this being at the expense of the lightness and flexibility of the end product.

The present disclosure further provides a component of a frame for eyeglasses that is capable of offering flexibility characteristics that are such as to allow an adaptation of the eyeglass frame to the different shape structures of the heads of the users.

Also, the present disclosure provides a component of a frame for eyeglasses that has different flexibility characteristics over the extension of the temple.

Further, the present disclosure provides a component of a frame for eyeglasses that can be used both for providing temples and for providing the upper bar of the front of the eyeglass frame.

The present disclosure provides a component of a frame for eyeglasses that is highly reliable, easily and practically implemented and has competitive costs.

This aim and these and other features which will become more apparent hereinafter are all achieved by providing a component of a frame for eyeglasses, comprising a body made of composite material, characterized in that said body comprises at least one first region and at least two second regions, said first region having a three-dimensional shape that has at least two dimensions that are larger than the dimensions of said at least two second regions of the body, so as to define, along said body, portions with different flexibilities.

BRIEF DESCRIPTION OF THE DRAWINGS

Further characteristics and advantages of the disclosure will become more apparent from the description of preferred, but not exclusive, embodiments of the component of a frame for eyeglasses according to the present disclosure, which are illustrated by way of non-limiting example in the accompanying drawings, wherein:

FIG. 1 is a view from above of the component of a frame for eyeglasses, identified by a temple for an eyeglass frame, according to a first embodiment of the present disclosure;

FIG. 2 is a side elevation view of the temple according to the present disclosure.

DETAILED DESCRIPTION OF THE DRAWINGS

Figure 3:
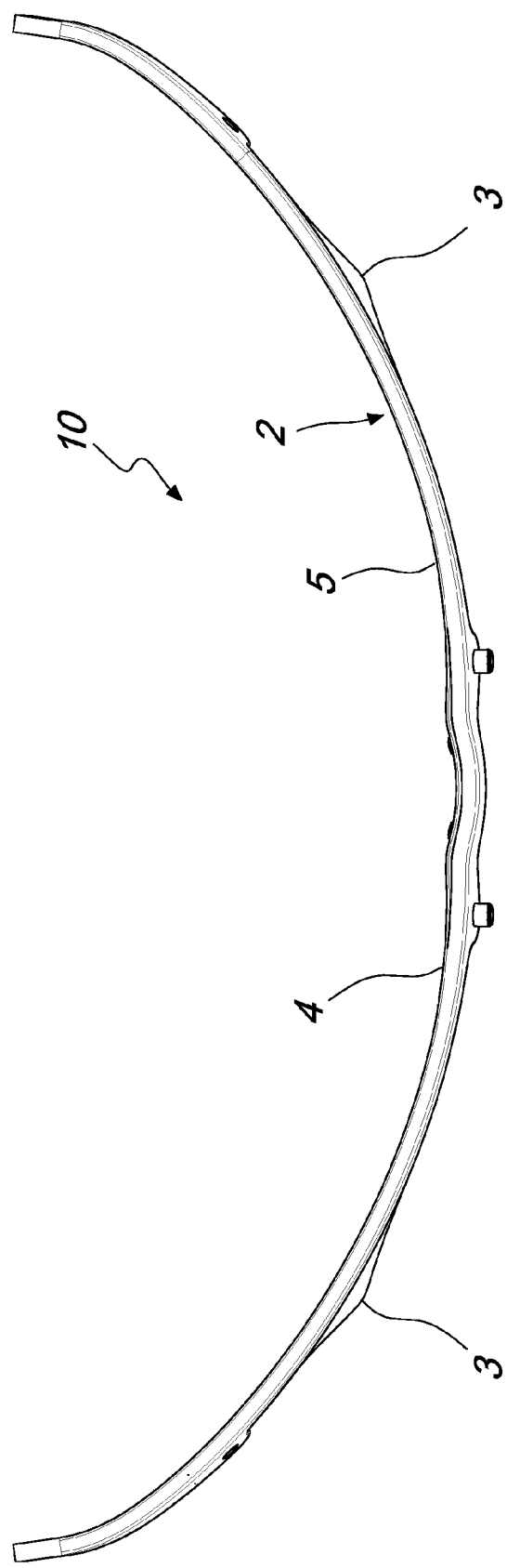
FIG. 3 is a plan view from above of a second embodiment of the disclosure, identified by an upper bar of the front of an eyeglass frame.

With reference to the figures, the component of a frame for eyeglasses, generally designated by the reference numeral 1 for the first embodiment, comprises a rod-like body 2, which in the case of FIG. 1 is shown to be a temple of an eyeglass frame, which has the peculiarity of having at least one first region 3 with a three-dimensional shape that has at least two dimensions that are larger than the dimensions of at least two second regions 4, 5 of the body 2, so as to define, along the rod-like body 2, portions with different flexibilities (i.e. with different stretch modulus).

The component of a frame illustrated is made of composite materials which comprise reinforcement fibers, including carbon fibers.

The definition "first region 3" in this case defines a region 3 that has, as has been said, a three-dimensional shape structure, and in more detail, that has a thickness and a height (the length should be understood as the dimension defined along the longitudinal extension of the rod-like body 2).

Therefore, the first region 3 is a region provided with both a greater thickness, and a greater height than the remaining portions of the body 2.

This ensures that the first portion 3 has a higher rigidity than the remaining portions of the body 2.

The first region 3 has a transverse cross-section that can assume various shapes, indicatively and non exhaustively, triangular, circular, elliptical, rhomboid.

The at least two second regions 4 and 5 of the rod-like body 2 can have lengths that are identical or mutually different.

It is furthermore possible to have more than one region 3 of greater thickness and height than the remaining regions 4 and 5.

The lower rigidity of the regions 4 and 5 is due to the lower thickness and height (and thus cross-section) of such regions with respect to the at least one first region 3, in order to make it possible to shape the body 2 according to the shape of the head of the user.

The cross-sections of the regions 4 and 5 can be identical or different, in the same way as the lengths, as previously described.

The number of regions 4 and 5 can exceed two and be for example three.

To sum up, there are substantially four cases:

a) regions 4 and 5 with identical cross-sections and identical lengths;

b) regions 4 and 5 with identical cross-sections and different lengths;

c) regions 4 and 5 with identical lengths and different cross-sections;

d) regions 4 and 5 with different cross-sections and different lengths.

The stretch modulus (which mainly depends on the cross-section and length, with identical conditions of the process for producing the composite material) of the region 3 is higher than the stretch modulus of the regions 4 and 5.

If the stretch modulus of the regions 4 and 5 is identical then there will be two portions with different flexibilities along the rod-like body 2.

If on the other hand the stretch modulus of the regions 4 and 5 is different, then there will be three portions with different flexibilities along the rod-like body 2.

The body 2 which FIG. 1 illustrates for the purposes of example as a temple of an eyeglass frame can also constitute the upper bar 10 of the frame of the eyeglass frame (as illustrated in FIG. 3), which can have in this case too at least one first region 3 and at least two second regions 4 and 5 of the same length, or it can have one region 3 and two regions 4 and 5 of mutually different lengths.

The component of a frame for eyeglasses provided in this manner makes it possible to define, along the extension of the rod-like body 2, mutually different cross-sections as shapes, so as to be able to have, along the length of the body 2, different shapes that contribute to creating a three-dimensional effect of the temple or of the upper bar of the front of the eyeglass frame.

An adequate flexibility of the body 2 is ensured by the presence of regions with thicknesses and heights which are different from those of the remaining regions, accompanied by an excellent mechanical strength in that the region or the regions 3 of greater thickness and height (and thus rigidity) than those of the remaining regions of the body 2 make it possible to provide the mechanical rigidity required by the component of a frame for eyeglasses 1.

The region 3 of the rod-like body 2 makes it possible to obtain, for the rod-like body 2, a ratio of strength to deformation that allows the existence of one or more maximum points. In the event of the presence of more regions 3 the ratio of strength to deformation is always of the type mentioned above, but with a different period. In practice it has been found that the component of a frame for eyeglasses according to the present disclosure fully achieves the set aim and objects, in that it makes it possible to offer a differentiated flexibility with respect to conventional components, accompanied by an excellent mechanical strength, combined with an attractive appearance due to the three-dimensional effect created by regions of the body 2 with differentiated cross-section.

The component of a frame for eyeglasses, thus conceived, is susceptible of numerous modifications and variations.

Moreover, all the details may be substituted by other, technically equivalent elements.

In practice the materials employed, and the contingent dimensions and shapes, may be any according to requirements and to the state of the art.

The disclosures in Italian Patent Application No. MI2013A001428 from which this application claims priority are incorporated herein by reference.

The invention claimed is:

1. A component of a frame for eyeglasses, comprising a body made of composite material, wherein said body comprises at least one first region and at least two second regions, said first region having a three-dimensional shape that has at least two dimensions including a thickness and a height that are larger than the dimensions of said at least two second regions of the body, so as to define, along said body, portions with different flexibilities.

2. The component of a frame for eyeglasses according to claim 1, wherein said portions with different flexibilities are at least two in number.

3. The component of a frame for eyeglasses according to claim 1, wherein said at least two second regions of said body have mutually identical lengths and cross-sections.

4. The component of a frame for eyeglasses according to claim 1, wherein said at least two second regions of the body have mutually different lengths and identical cross-sections.

5. The component of a frame for eyeglasses according to claim 1, wherein said at least two second regions of the body have mutually different cross-sections and identical lengths.

6. The component of a frame for eyeglasses according to claim 1, wherein said at least two second regions of the body have mutually different cross-sections and different lengths.

7. The component of a frame for eyeglasses according to claim 1, wherein said at least one first region of the body has a cross-section selected from a plurality of geometric shapes.

8. The component of a frame for eyeglasses according to claim 1, wherein said body is a temple for an eyeglass frame.

9. The component of a frame for eyeglasses according to claim 1, wherein said body is an upper bar of a front of an eyeglass frame.

* * * * *